United States Patent [19]

Nishimura

[11] Patent Number: 4,880,253
[45] Date of Patent: Nov. 14, 1989

[54] DRIVING FORCE TRANSMITTING STRUCTURE FOR AUTOMATIC SEAT BELT APPARATUS

[75] Inventor: Yuji Nishimura, Aichi, Japan

[73] Assignee: Kabushiki Kaisha Tokai-Rika-Denki-Seisakusho, Aichi, Japan

[21] Appl. No.: 143,038

[22] Filed: Jan. 12, 1988

[30] Foreign Application Priority Data

Jan. 13, 1987 [JP] Japan .............................. 62-003336[U]

[51] Int. Cl.⁴ .............................................. B60R 21/10
[52] U.S. Cl. ..................................... 280/804; 16/93 R
[58] Field of Search ......................... 280/804, 802, 803; 297/469; 16/93 R, 93 D, 95 R, 95 D; 403/381, 354, 364

[56] References Cited

U.S. PATENT DOCUMENTS 4,324,419 4/1982 Ueda ..................................... 280/804
4,717,174 1/1988 Nishimura ........................... 280/804

Primary Examiner—Charles A. Marmor
Assistant Examiner—Karin Tyson
Attorney, Agent, or Firm—Sixbey, Friedman, Leedom & Ferguson

[57] ABSTRACT

A driving-force transmitting structure applied to an automatic seat belt apparatus having a slide piece moved along a guide rail by a driving force and a slider adapted for supporting a webbing for restraining an occupant, the slider being capable of moving in response to the movement of the slide piece so as to apply the webbing around an occupant. This driving-force transmitting structure is adapted to transmit the driving force from the slide piece to the slider. The slide piece and the slider overlap each other. The slider is provided with opposed surfaces which face end surfaces of the slide piece facing in the direction of movement of the slide piece.

15 Claims, 7 Drawing Sheets

PRIOR ART

DRIVING FORCE TRANSMITTING STRUCTURE FOR AUTOMATIC SEAT BELT APPARATUS

BACKGROUND OF THE INVENTION

1. Field of the Invention

This invention relates to a driving-force transmitting structure used in an apparatus for automatically applying a seat belt around an occupant after he has seated, the driving-force transmitting structure being adapted for transmitting the driving force of a driving means to the webbing.

2. Related Art Statement

A type of automatic seat belt apparatus has been proposed which is capable of automatically applying a webbing around an occupant or releasing it from the occupant.

This type of apparatus is constructed in such a manner that one end of a webbing is wound up by a winding device disposed at the center of the vehicle, and the other end of the webbing is in engagement with a slider which can slide toward the front or rear of the vehicle while being guided by a guide rail disposed in the vicinity of one side of the roof of the vehicle, enabling the webbing to be applied or released by moving the slider. The driving force of a driving means is transmitted to the slider via a wire rope which can transmit a tensile force or compressive force.

Figure 7:
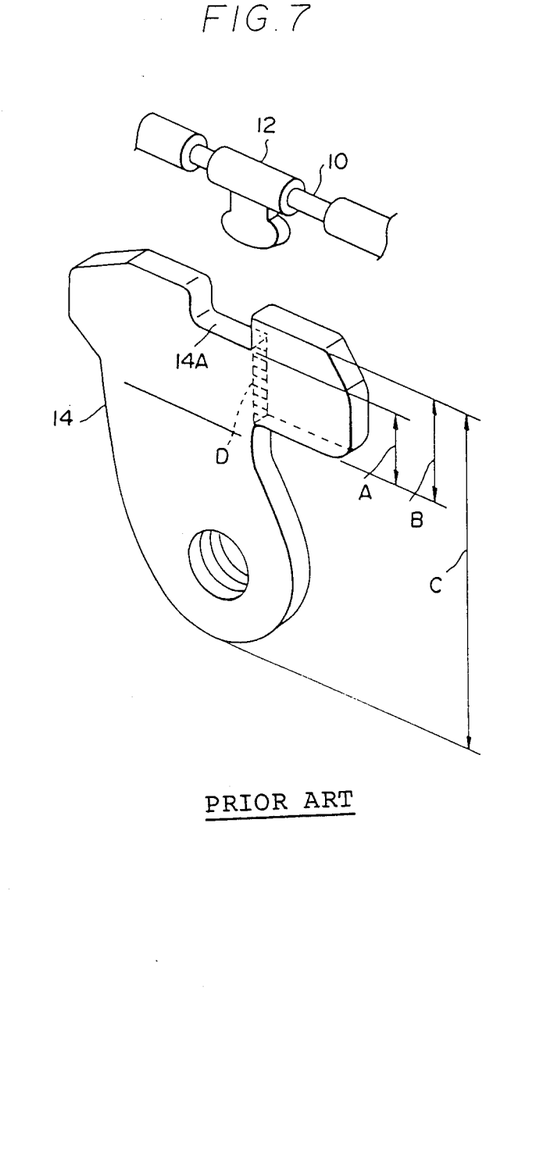
FIG. 7 is an exploded perspective view of a conventional driving-force transmitting structure.

This transmitting structure is constructed in such a manner that, as shown in FIG. 7, a slide piece 12 which is attached to an end of a wire rope 10 is engaged with a cutout recess 14A formed in a head portion of a slider 14 in the form of a plate.

However, in this transmitting structure, a dimension A shown in FIG. 7 is reduced by the provision of the cut-out recess 14A in the slider 14, and, therefore, the sectional area at a section D indicated in FIG. 7 is small, resulting in a reduction in the strength of the slider. To improve this strength, the sectional area at the section D may be increased by increasing the dimension A shown in FIG. 7. However, this means an increase in the dimension B shown in FIG. 7 and, hence, the overall size or length of the slider (dimension C shown in FIG. 7), resulting in an increase in the extent to which the slider projects inside the passenger accommodation of the vehicle.

SUMMARY OF THE INVENTION

The present invention has been achieved in consideration of these facts, and an object of the present invention is to provide a driving-force transmitting structure used in an automatic seat belt apparatus.

To this end, the present invention provides a driving-force transmitting structure used in an automatic seat belt apparatus including a sliding member moved by the driving force of a driving means, and a slider to which a webbing for restraining an occupant is connected and which is adapted to apply the webbing around the occupant by being moved in response to the movement of the sliding member, the driving-force transmitting structure being adapted for transmitting the driving force to the slider through the sliding member, wherein at least one of side surfaces of the sliding member and at least one of side surfaces of the slider which extend in the direction of movement of the sliding member face each other, and the slider has a pair of opposed surfaces which face end surfaces of the sliding member facing in the direction of movement of the sliding member.

In accordance with the present invention, each the end surfaces of the sliding member facing in the direction of movement of the siding member is engaged with corresponding one of the opposed surfaces provided on the side surface of the slider while the sliding member partially overlaps the side surface of the sliding member, thereby enabling the driving force of the driving means to be transmitted to the slider so as to apply the webbing around the occupant.

Therefore, the provision of a cut-out portion in the slider for engagement with the sliding member is eliminated, thereby increasing the sectional area of the slider and, hence, the strength of the slider. In addition, there is no increase in the extent to which the slider projects inside the passenger accommodation of the vehicle since the sliding member overlaps the slider.

DESCRIPTION OF THE PREFERRED EMBODIMENTS

Figure 1:
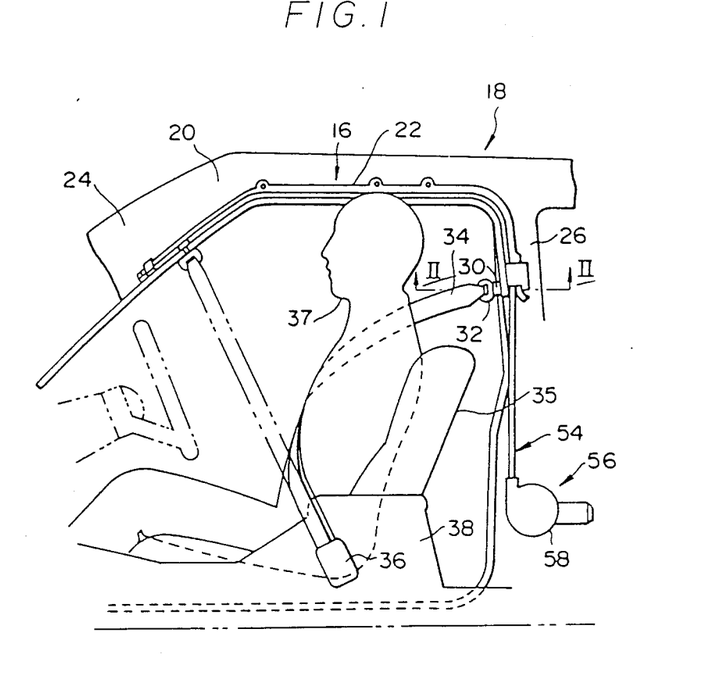
FIG. 1 is a cross-sectional view of an automatic seat belt apparatus to which the present invention is applied and which is seen from one side of the vehicle.

FIG. 1 shows an automatic seat belt apparatus 18 to which a first embodiment of the present invention is applied.

A guide rail 22 is mounted on a roof-side rail (not shown) along a roof side 20 of a vehicle 18.

One end of the guide rail 2 is extended along a front pillar 24 of the vehicle 18, and the other end nearer to the rear of the vehicle is bent through about 90° along a center pillar 26.

Figure 2:
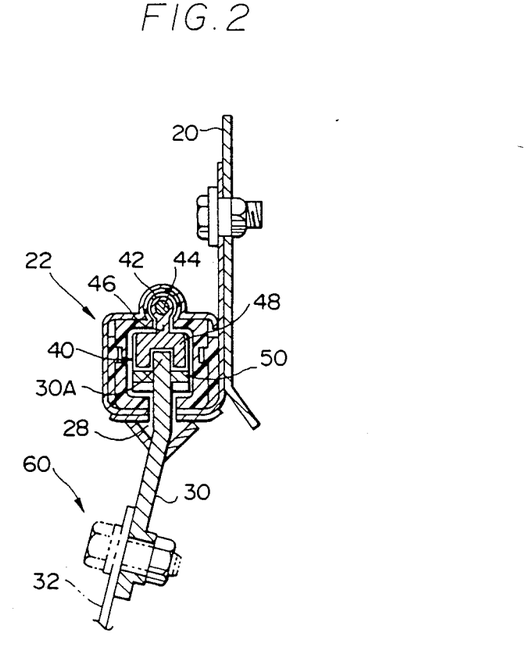
FIG. 2 is a cross-sectional view taken along the line II—II of FIG. 1, illustrating a part of the apparatus including a driving-force transmitting structure which represents a first embodiment of the present invention.

As shown in FIG. 2, a groove 28 is formed in a downward-facing surface of the guide rail 22 in such a manner that it extends in the longitudinal direction of the guide rail 22 over the entire length thereof. A slider 30 is inserted into the groove 28, and one end of the webbing 34 (refer to FIG. 1) is connected to the slider 30 by a connection member 32.

As shown in FIG. 1, the other end of the webbing 34 is wound by a winding device 36 disposed at the center of the vehicle and is accommodated therein as a roll. The winding device 36 is fixed inside a center console to the body of the vehicle.

The winding device 36 incorporates an inertia lock mechanism which can instantaneously stop the webbing 34 from being drawn out by detecting the state of emergency of the vehicle by means of an acceleration sensor.

As shown in FIG. 2, the width of an internal portion of the groove 28 is increased and a head 40 formed at an end portion of the slider 30 is accommodated in this portion. A wire accommodation groove 42 is formed in the bottom surface of the groove 28 in such a manner that it extends in the longitudinal direction of the guide rail 22 over the entire length thereof, as in the case of the groove 28. An elongated member or a wire rope 44 is disposed in the wire accommodation groove 42.

A rear end of the wire rope 44 extends along the wire accommodation groove 42 of the guide rail 22, passes through a wire guide tube 54 (refer to FIG. 5) disposed at the rear end of the guide rail 22, and is wound around a winding reel 58 of a driving means 56.

If the driving means 56 rotates in the normal direction, a compressive force occurs in the wire rope 44 inside the wire guide tube 54, and the wire rope 44 moves along the wire accommodation groove 42 toward the front of the vehicle. If the driving means 56 rotates in the reverse direction, a tensile force occurs inside the wire guide tube 54, and the wire rope 44 moves toward the rear of the vehicle.

Figure 3:
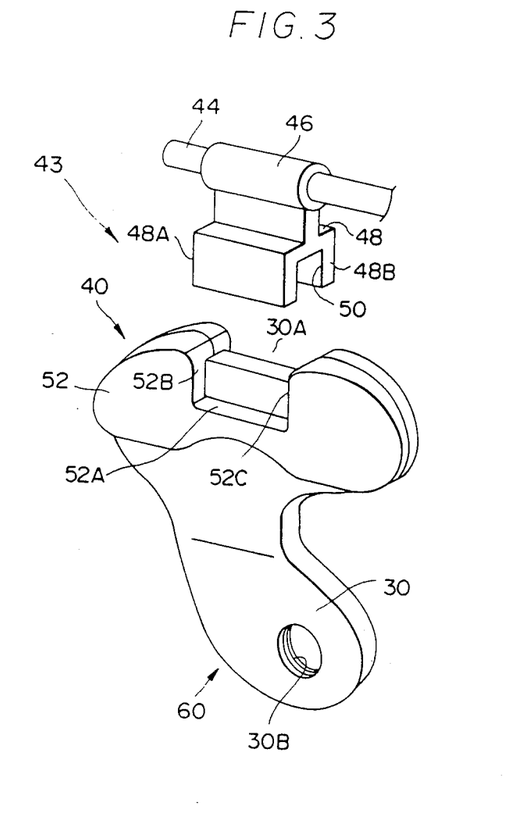
FIG. 3 is an exploded perspective view of the first embodiment.

FIG. 3 shows a driving-force transmitting structure 43. A sliding member or a slide piece 46 is attached to the front end of the wire rope 44. The slide piece 46 has a projection 48 which extends in the direction of the slider 30. A rectangular groove 50 whose opening faces the slider 30 is formed in the projection 48 so that it extends in the axial direction of the wire rope 44. The groove 50 is mated with an upper-end portion 30A of the head 40 of the slider 30.

The head 40 is formed by fixing a slider shoe 52 to an upper portion of the slider 30 in such a manner that the slider shoe 52 pinches opposite surfaces of this portion, so that the head 40 has an increased thickness, thereby preventing the slider 30 from coming out of the groove 28. The slider shoe 52 slides on internal surfaces of the groove 28, thereby facilitating the movement of the slider 30. An intermediate portion of the slider shoe 52 is cut out so as to form a recess 52A through which the upper-end portion 30A of the slider 30 is exposed. The projection 48 of the slide piece 48 is accommodated in the recess 52A while the upper-end portion 30A is accommodated in the groove 50. In this state, an end surface 48A of the projection 48, which is nearer to the front end of the wire 44, faces an inside surface 52B of the recess 52A while an end surface 48B nearer to the rear end of the wire faces an inside surface 52C of the recess 52A.

Therefore, if the slide piece 46 is moved toward the front of the vehicle, the end surface 48A is brought into contact with and pressed against the inside surface 52B of the recess 52A, thereby transmitting the driving force of the driving means 56 to move the slider 30 toward the front of the vehicle. If the slide piece 46 is moved toward the rear of the vehicle, the end surface 48B is brought into contact with and pressed against the inside surface 52C of the recess 52A, thereby transmitting the driving force of the driving means 56 to move the slider 30 toward the rear of the vehicle.

A lower portion of the slider 30 projects inside the passenger accommodation, and a tapped hole 30B is formed in a lower-end portion 60 of the slider 30. The connection member 32 such as an anchor plate for connection to the webbing 34 is attached to the slider 30 by the tapped hole 30B.

The operation of the first embodiment will be described below.

Before an occupant 37 is seated in the vehicle, a space is formed between the webbing 34 and a seat 35 by the movement of the slider 30 to the end of the guide rail 22 nearer to the front of the vehicle. This enables the occupant 37 to easily sit on the seat 35.

When the occupant 37 sits on the seat, the driving means 56 rotates in the reverse direction and a tensile force occurs in the wire rope 44, so that the slide piece 46 is pressed against the side surface 52C of the slider shoe 52, thereby transmitting the driving force of the driving means 56 to move the slider 30 along the guide rail 22 to the end thereof nearer to the rear of the vehicle. The webbing is thereby applied around the occupant 37.

If, in this state, an emergency state of the vehicle occurs, the acceleration sensor detects this state and the inertia lock mechanism operates to instantaneously inhibit the webbing 34 from being paid out from the winding device 36. The occupant 37 can be thereby restrained.

When the occupant 37 gets off the vehicle after the vehicle has traveled in an ordinary manner, the driving means 56 rotates in the normal direction and a compressive force is produced in the wire rope 44 inside the wire guide tube 54. This compressive force presses the slide piece 46 against the side surface 52B of the slider shoe 52, thereby transmitting the driving force of the driving means 56 to move the slider 30 along the guide rail 22 to the end thereof nearer to the rear of the vehicle. The webbing 34 applied around the occupant 37 is thereby released.

In the first embodiment, the slide piece 46 is accommodated in the recess 52A of the slider shoe 52 while the upper-end portion 30A is accommodated in the groove 50, and there is no cut-out portion formed in the slider 30. Therefore, the sectional area of the slider is large, resulting in an improvement in the strength of the slider. In addition, there is no increase in the extent to which the slider projects inside the passenger accommodation, since the slide piece 46 engages with the slider by partially overlapping it on the opposite sides thereof inside the recess 52A.

Figure 4:
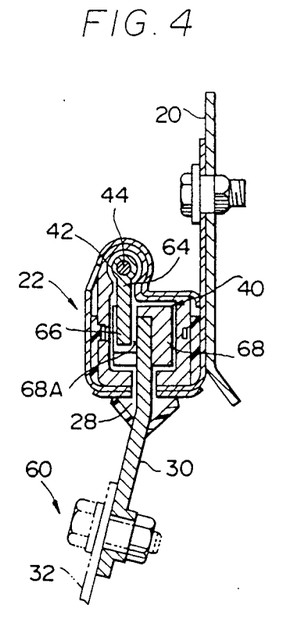
FIG. 4 is a cross-sectional view of a second embodiment corresponding to FIG. 2.
Figure 5:
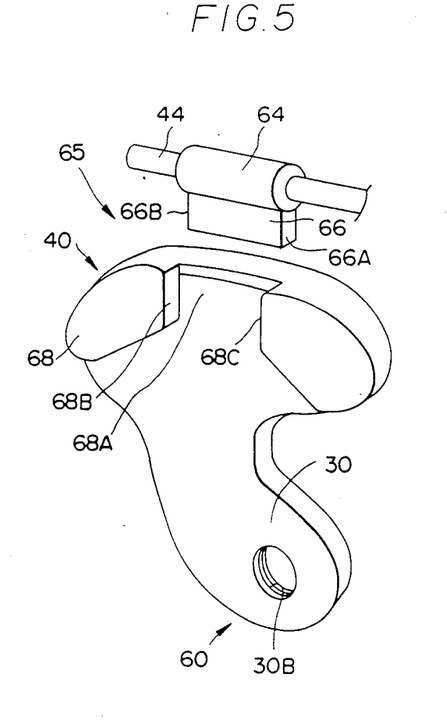
FIG. 5 is an exploded perspective view of the second embodiment corresponding to FIG. 3.

FIGS. 4 and 5 show a second embodiment of the present invention.

FIG. 5 shows a driving-force transmitting structure 65. A slide piece 64 is attached to the front end of the wire rope 44. The slide piece 64 has a projection 66 which extends in the direction of the slider 30 in the axial direction of the wire rope 44. Opposite-end surfaces 66A and 66B face in the axial direction of the wire rope 44.

The head 40 is formed by fixing a slider shoe 68 to an upper portion of the slider 30 in such a manner that the slider shoe 68 pinches opposite surfaces of this portion. A recess 68A is formed in an intermediate portion of the slider shoe 68 on one side of the slider 30. The projection 68 of the slide piece 64 is accommodated in the recess 68A. In this state, the end surface 66B of the projection 66 faces an inside surface 68B of the recess 68A while the end surface 66A faces an inside surface 68C of the recess 68A.

Therefore, if the slide piece 64 is moved toward the front of the vehicle, the end surface 66B is brought into contact with and pressed against the inside surface 68B of the recess 68A, thereby transmitting the driving force of the driving means 56 to move the slider 30 toward the front of the vehicle. If the slide piece 64 is moved toward the rear of the vehicle, the end surface 66A is brought into contact with and pressed against the inside surface 68C of the recess 68A, thereby transmitting the driving force of the driving means 56 to move the slider 30 toward the rear of the vehicle.

In the second embodiment, the projection 66 of the slide piece 64 is accommodated in the recess 68A of the slider shoe 68 formed on one side of the slider, and there is no cut-out portion formed in the slider 30, as in the case of the first embodiment. Therefore, the sectional area of the slider is large, resulting in an improvement in the strength of the slider 30. In addition, there is no increase in the extent to which the slider 30 projects inside the passenger accommodation, since the slide piece 64 engages with the slider 30 by partially overlapping it in the recess 68A.

Figure 6:
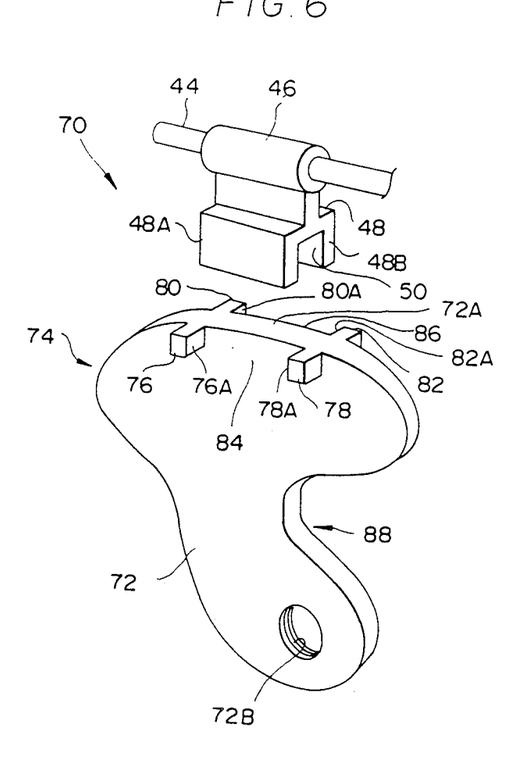
FIG. 6 is an exploded perspective view of a third embodiment corresponding to FIGS. 3 and 5.

FIG. 6 shows a driving-force transmitting structure 70 which represents a third embodiment of the present invention. A slide piece 46 which is the same as that in the first embodiment is attached to the front end of the wire rope 44. A groove 50 which is formed in the slide piece 46 is mated with an upper-end portion 72A of the head 74 of a slider 72.

Two pairs of projections 76, 78, 80 and 82 are integrally formed on two side surfaces of the head 74 of the slider 72 in such a manner that they extend in directions perpendicular to these surfaces. An accommodation section 84 is formed by the projections 76 and 78 and the side surface of the slider 72 while an accommodation section 86 is formed by the projections 80 and 82 and the side surface of the slider 72. A projecting portion 48 of the slider piece 46 is accommodated in the accommodation sections 84 and 86 while the upper-end portion 72A is accommodated in the groove 50. In this state, an end surface 48A of the projecting portion 48, which is nearer to the front end of the wire 44, faces a side surface 76A of the projection 76 and a side surface 80A of the projection 80 while an end surface 48B nearer to the rear end of the wire faces a side surface 78A of the projection 78 and a side surface 82A of the projection 82.

A lower portion of the slider 72 projects inside the passenger accommodation, as in the case of the first or second embodiment, and a tapped hole 72B is formed in a lower-end portion 88 of the slider 72. The connection member 32 such as an anchor plate for connection to the webbing 34 is attached to the slider 72 by the tapped hole 72B.

Therefore, if the slide piece 46 is moved toward the front of the vehicle, the end surface 48A is brought into contact with and pressed against the side surfaces 76A and 80A of the projections 76 and 80, thereby transmitting the driving force of the driving means 56 to move the slider 72 toward the front of the vehicle. If the slide piece 46 is moved toward the rear of the vehicle, the end surface 48B is brought into contact with and pressed against the side projections 78 and 82, thereby transmitting the driving force of the driving means 56 to move the slider 72 toward the rear of the vehicle.

In the third embodiment, the projecting portion 48 of the slide piece 46 is accommodated in the accommodation sections 84 and 86 formed by the projections 76, 78, 80 and 82 projecting from the side surfaces of the slider 72. There is no cut-out portion formed in the slider 72, as in the case of the first embodiment. Therefore, the sectional area of the slider is large, resulting in an improvement in the strength of the slider 30. In addition, there is no increase in the extent to which the slider 72 projects inside the passenger accommodation, since the slide piece 46 engages with the slider 72 by partially overlapping it in the accommodation sections 84 and 86 while accommodating the upper-end portion 72A.

In the third embodiment, projections are formed on both side surfaces of the slider 72, but the projections may be formed on only one side of the slider. In this case, the slide piece 64 in accordance with the second embodiment many be used.

In accordance with the present invention, as described above, opposite-end surfaces of the sliding member disposed along the axis of an elongated member are engaged with opposite surfaces formed on the side of the slider, and the sliding member is disposed in such a manner that it partially overlaps the slider, thereby enabling the driving force of the driving means to be transmitted to the slider via the elongated member. It is therefore possible to increase the strength of the slider without increasing the extent to which the slider projects inside the passenger accommodation of the vehicle.

What is claimed is:

1. A driving-force transmitting structure for an automatic seat belt apparatus comprising:
    a sliding member being movable by a driving force of a driving means in a direction of movement and having a groove extending from a neck portion in said direction of movement; and
    a slider having a fitting portion for mating with said groove and a pair of opposed surfaces for facing end surfaces of said sliding member which face in the direction of movement of said sliding member, and being connected to a webbing for restraining an occupant and applying said webbing around said occupant by movement in response to movement of said sliding member, said driving-force transmitting structure being adapted for transmitting said driving force to said slider through said sliding member, wherein side surfaces of said sliding member are opposed to side surfaces of said slider to positively locate said sliding member along said side surfaces of said slider.

2. A driving-force transmitting structure for an automatic seat belt apparatus according to claim 1, wherein said opposed surfaces are formed on raised portions projecting from said side surfaces of said slider at positions adjacent to said fitting portion.

3. A driving-force transmitting structure for an automatic seat belt apparatus according to claim 1, wherein said sliding member has spaced apart opposite walls, and said slider has a slider shoe provided on both of said side surfaces to which said end surface of said sliding member are respectively engaged.

4. A driving-force transmitting structure for an automatic seat belt apparatus comprising:
    a sliding member having an elongated member capable of being moved by a driving force of a driving means in opposite directions, said elongated member including spaced apart opposing walls and a groove defined by said opposing walls extending in a longitudinal direction of said elongated member;
    a slider for supporting a webbing to apply around and restrain an occupant by movement of said sliding member in one direction for releasing said webbing from said occupant by the movement of said sliding member in the other direction, said slider having a fitting portion for mating with said groove of said sliding member, and at least one pair of projections projecting from an upper portion of said slider transverse to said longitudinal direction; and at least one opposing surface formed on said slider for facing a side surface of said sliding member generally parallel to the longitudinal direction of said elongated member;

whereby contact surfaces of said projections of said slider are contacted by end surfaces of said opposing walls of said sliding member in the longitudinal direction of said elongated member, said driving force being transmitted from said sliding member to said slider through said projections.

5. A driving-force transmitting structure for an automatic seat belt apparatus according to claim 4, wherein said slider includes a recess having a rectangular cross section and is adapted for accommodating a part of said sliding member, said opposing surface of said slider being to the bottom surface of said recess.

6. A driving-force transmitting structure for an automatic seat belt apparatus according to claim 4, wherein contact surfaces of said slider are formed on raised portions at the opposite sides thereof along the longitudinal direction of said elongated member.

7. A driving-force transmitting structure for an automatic seat belt apparatus comprising:

an elongated guide rail extending in the longitudinal direction of a vehicle; a slide piece having a groove formed of opposing side surfaces in a longitudinal direction of said guide rail and disposed on said guide rail and capable of being moved by the driving force of a driving means toward the front or the rear of the vehicle; a slider having a fitting portion for mating with said groove and adapted for supporting at its one end a webbing for restraining an occupant and supported at its other end on said rail;

at least one side surface formed on said slider for facing at least one of said opposing side surfaces formed on said slide piece generally in parallel to the longitudinal direction of said guide rail for positively locating said slide piece along said side surface of said slider; and a pair of transmission surfaces formed on said slider, said pair of transmission surfaces facing and being close to end surfaces of said slide piece facing in the longitudinal direction of said guide rail and capable of receiving said driving force, while said opposing side surfaces of said slide piece and said side surface of said slider are facing each other, wherein said slider is moved by receiving said driving force so as to apply said webbing around said occupant or release said webbing from said occupant, and said driving force transmitting structure is adapted for transmitting said driving force of said driving means to said slider through said sliding member.

8. A driving-force transmitting structure for an automatic seat belt apparatus according to claim 7, wherein said pair of transmission surfaces are formed on a pair of projections projecting from said side surface of said slider.

9. A driving-force transmitting structure for an automatic seat belt apparatus according to claim 7, wherein said slider is provided with at least one recess having a rectangular cross section and adapted for accommodating a part of said slide piece, said side surface of said slider being to a surface of said recess, and said pair of transmission surfaces being a pair of opposed surfaces of said recess.

10. A driving-force transmitting structure for an automatic seat belt apparatus according to claim 7, wherein said side surface of said slider is formed of a surface of said fitting portion facing a side surface of said groove.

11. A driving-force transmitting structure for an automatic seat belt apparatus according to claim 10, wherein said pair of transmission surfaces of said slider are formed on raised portions which project from positions adjacent to said fitting portion at the opposite sides thereof along the longitudinal direction of said guide rail.

12. A driving-force transmitting structure for an automatic seat belt apparatus comprising:

a sliding member having a plate-like projecting portion extending in a direction of movement thereof and being movable by a driving force of driving means, said sliding member including a bottom surface, side surfaces and end surfaces facing in said direction of movement; and a slider having at least one side surface and a pair of opposed surfaces formed on a pair of projections extending from said side surface of said slider for defining a recess therebetween to receive said plate-like projecting portion of said sliding member, said side surface of said slider contracting at least one side surface of said sliding member for positively locating and supporting said sliding member on said slider along said side surfaces, and said pair of opposed surfaces facing each of said end surfaces of said sliding member with said slider being connected to a webbing for restraining an occupant and applying said webbing around said occupant by movement in response to movement of said sliding member, said driving-force transmitting structure being adapted for transmitting said driving force to said slider through said sliding member.

13. A driving-force transmitting structure for a seat belt apparatus according to claim 12, wherein said slider has a slider shoe which defines said pair of projections, and said plate-like projecting portion of said sliding member is engaged between said projections of said slider shoe.

14. A driving-force transmitting structure for an automatic seat belt apparatus comprising, a movable sliding member including a platelike projecting portion extending in a direction of movement of a vehicle having a bottom face, side faces and end faces, and a slider having an upper portion and a lower portion, said upper portion including a receiving means for receiving said projecting portion and strengthening means extending along said upper portion and having at least one side surface facing a side face of said projecting portion when said projecting portion is received in said receiving means for positively locating said slider member along said side surface of said slider, wherein said lower portion retains a webbing such that upon movement of said sliding member by said driving-force, said driving-force is transferred to said slider through said end faces and said opposed surfaces to move said slider to apply and release said webbing from around an occupant of a vehicle.

15. A driving-force transmitting structure for an automatic seat belt apparatus comprising, an elongated movable sliding member extending in a longitudinal direction of a vehicle including a pair of spaced transversely extending longitudinal extensions each having a bottom face, said faces and end faces; and a slider having an upper and lower portion, said upper portion including a receiving means for receiving said pair of spaced extensions, and a pair of opposed side surfaces for facing one of said side faces of said each of extensions to positively locate said sliding member along said side surfaces of said slider, and said lower portion retaining a webbing such that upon movement of said sliding member by said driving-force, said driving-force is transferred to said slider through said end faces of sail sliding member and contact surfaces of said slider to move said slider to apply and release said webbing from around an occupant of said vehicle.

* * * * *